United States Patent
Galbis et al.

(10) Patent No.: US 8,975,887 B2
(45) Date of Patent: Mar. 10, 2015

(54) SUPPRESSING OSCILLATIONS IN AN OUTPUT OF A SWITCHED POWER CONVERTER

(71) Applicants: Pablo Moreno Galbis, Palo Alto, CA (US); James E. C. Brown, San Jose, CA (US); Cory Severson, Coarsegold, CA (US)

(72) Inventors: Pablo Moreno Galbis, Palo Alto, CA (US); James E. C. Brown, San Jose, CA (US); Cory Severson, Coarsegold, CA (US)

(73) Assignee: R2 Semiconductor, Inc., Sunnyvale, CA (US)

( * ) Notice: Subject to any disclaimer, the term of this patent is extended or adjusted under 35 U.S.C. 154(b) by 158 days.

(21) Appl. No.: 13/795,505

(22) Filed: Mar. 12, 2013

(65) Prior Publication Data
US 2014/0009130 A1    Jan. 9, 2014

Related U.S. Application Data

(60) Provisional application No. 61/669,093, filed on Jul. 8, 2012.

(51) Int. Cl.
*G05F 1/00* (2006.01)
*G05F 1/46* (2006.01)
*H02M 3/156* (2006.01)

(52) U.S. Cl.
CPC ........ *G05F 1/46* (2013.01); *H02M 3/156* (2013.01)
USPC .............................. 323/285; 323/271; 323/284

(58) Field of Classification Search
CPC .................................. G05F 1/46; G05F 1/565
USPC ......... 323/222, 223, 225, 268, 271, 282, 284, 323/285
See application file for complete search history.

(56) References Cited

U.S. PATENT DOCUMENTS

| | | |
|---|---|---|
| 5,994,885 A | 11/1999 | Wilcox et al. |
| 6,862,198 B2 | 3/2005 | Muegge |
| 7,301,488 B2 | 11/2007 | Leung |
| 7,586,767 B1 | 9/2009 | Prodic |
| 7,622,820 B1 | 11/2009 | Prodic |
| 7,656,140 B2 | 2/2010 | Marino |

(Continued)

OTHER PUBLICATIONS

PCT, Notification of Tranmittal of the International Search Report and the Written Opinion of the International Searching Authority, or the Declaration, International Application No. PCT/US2013/045111, International Filing Date Jun. 11, 2013.

(Continued)

*Primary Examiner* — Matthew Nguyen
(74) *Attorney, Agent, or Firm* — Brian R. Short

(57) ABSTRACT

Embodiments of systems, methods and apparatuses of a switching voltage regulator are disclosed. One switching voltage regulator includes a series switch element, a shunt switch element, a PWM controller, and a mode controller. The PWM controller includes an error amplifier and a switching controller. The error amplifier generates an error signal based on a difference between a reference voltage and an output voltage. Further, the switching controller is operative to generate switch element control voltages based on the error signal, for controlling opening and closing of the series switch element and the shunt switch element, wherein the opening and closing of the series switch element and the shunt switch element generates a switching voltage. The mode controller is operative adjust a gain of the error amplifier over a selected range of frequencies based on a parameter indicative of a likelihood of oscillations in the output voltage.

7 Claims, 16 Drawing Sheets

(56) References Cited

U.S. PATENT DOCUMENTS

| | | |
|---|---|---|
| 7,705,577 B2 | 4/2010 | Li |
| 7,714,554 B2 | 5/2010 | Jacques |
| 7,714,557 B2 * | 5/2010 | Hasegawa ............ 323/283 |
| 7,782,024 B2 * | 8/2010 | Fukushi et al. ............ 323/224 |
| 7,881,079 B2 | 2/2011 | Prasad |
| 8,013,580 B2 | 9/2011 | Cervera |
| 8,077,490 B1 | 12/2011 | Prodic |
| 8,143,871 B1 | 3/2012 | Gardner |
| 8,183,848 B2 * | 5/2012 | Kuo ............ 323/285 |
| 8,188,722 B2 | 5/2012 | Lin |
| 2006/0227860 A1 | 10/2006 | Leung |
| 2009/0033309 A9 | 2/2009 | Trafton et al. |
| 2009/0212751 A1 | 8/2009 | Cervera |
| 2010/0072964 A1 | 3/2010 | Qiu et al. |
| 2010/0090672 A1 | 4/2010 | Lin |
| 2010/0141233 A1 | 6/2010 | Kwok |
| 2011/0234187 A1 | 9/2011 | Brown et al. |
| 2011/0316501 A1 | 12/2011 | Cervera |
| 2011/0317459 A1 | 12/2011 | Keubrich |
| 2012/0056610 A1 * | 3/2012 | Kimura ............ 323/351 |

OTHER PUBLICATIONS

Al-Hoor et. al., "Adaptive Digital Controller and Design Considerations for a Variable Switching Frequency Voltage Regulator", IEEE Trans Power Elect 24 p. 2589 (2009).

Burbano et. al., "Decreasing Quantization Effects in a Buck Converter Controlled by GZAD Strategy", LARC 2011.

Kohari et. al., On a Relaxation Oscillator with Periodic Threshold, ISCAS 1993 p. 2490.

Kurokawa et. al., A New Fast Response Digital Filter Control DC-DC Converter, INTELEC 2007 p. 527.

Kurokawa et. al., Improvement of Dynamic Characteristics of Digitally Controlled Switching Power Converter, PCC 2007 p. 1147.

Peng et. al., Modeling of Quantization Effects in Digitally Controlled DC-DC Converters, IEEE Trans Power Elect v 22 p. 208 (2007).

Stefanutti et. al., Energy-Based Approach for Predicting Limit Cycle Oscillations in Voltage-Mode Digitally-Controlled dc-dc Converters, APEC 2006 p. 1148.

Zhao et. al., Non-Zero Error Method for Improving Output Voltage Regulation of Low-Resolution Digital Controllers for SMPS, APEC 2008 p. 1106.

Zhou et. al., Effects of Modulations on the Sub-harmonic Oscillations of Digital Peak Current and Digital Valley Current Controlled Switching DC-DC Converters, IPEMC 2009 p. 1347.

R. Paul and D. Maksimovic, Smooth Transition and Ripple Reduction in 4-Switch Non-Inverting Buck-Boost Power converter for WCDMA RF Power Amplifier International Symposium on Circuits and Systems, (ISCAS) 2008 p. 3266.

\* cited by examiner

SUPPRESSING OSCILLATIONS IN AN OUTPUT OF A SWITCHED POWER CONVERTER

RELATED PATENT APPLICATIONS

This patent application claims priority to U.S. Provisional Patent Application 61/669,093, filed Jul. 8, 2012, which is herein incorporated by reference.

FIELD OF THE DESCRIBED EMBODIMENTS

The described embodiments relate generally to power conversion. More particularly, the described embodiments relate to methods and apparatuses to stabilize operation of a DC-DC converter during transient or quasi-static excursions to high duty cycles.

BACKGROUND

A buck DC-DC converter 101 is constructed from two switches, a series switch SW1 and a shunt switch SW2, with an inductor ($L_{OUT}$) connected to the node ($V_{SW}$) between the two switches (FIG. 1). In pulse-width-modulated (PWM) operation, during each switching cycle, the series switch SW1 is turned on for a period $T_{SW1}=DT_{sw}$, where D is the duty cycle and $T_{sw}$ is the switching period (FIG. 2). As depicted series switch state 210, the series switch SW1 is then turned off and as depicted by the shunt switch state 220 the shunt switch SW2 is turned on for a time $T_{SW2}=(1-D)T_{sw}-T_{dead}$, where $T_{dead}$ is the dead time during which both switches are held off (Dead times are interposed to ensure that the two switches (SW1, SW2) are not on simultaneously, which would permit current to flow directly from the supply to ground, with consequent excessive power dissipation and possible reliability impairment.) The output voltage of an ideal converter is $DV_{IN}$, where $V_{IN}$ is the input supply voltage. In a real converter, the output voltage is reduced from the ideal value due to the presence of finite parasitic resistance, inductance, and capacitance.

When the converter is to operate at output voltages close to the input voltage, D must approach 1. As a consequence, the shunt switch on-time $T_{SW2}$ becomes much shorter than the series switch on-time $T_{SW1}$. In particular, in a high-speed converter, in which the switching period may be reduced to some tens of nanoseconds, very short values of $T_{SW2}$ must be supported to achieve output voltage close to the input voltage. For example, if a switching frequency $f_{SW}$ of 35 MHz is employed, the switching period is 28 nanoseconds. To produce an output voltage of 3.4 V from an input voltage of 3.7 V, with output currents appropriate to the requirements of an RF power amplifier in a mobile radio transmitter, will require a duty cycle of about 95%. An ideal converter operating at a duty cycle of 95%, with dead times of 300 picoseconds preceding the turnon of SW1 and SW2, requires an on-time of (0.05)(28)−0.6=0.8 nanosecond for SW2. The PWM controller must produce a very short pulse, which must then be conveyed with good fidelity through a driver amplifier to drive a large switching transistor.

An exemplary buck converter is depicted in more detail in FIG. 3. The PWM Controller 310 comprises an error amplifier 320 with frequency-dependent compensation 330 and 335, to enable the converter to adjust the duty cycle for the desired output voltage while maintaining stable operation. The error amplifier output is compared by comparator 315 to a sawtooth waveform 325 to produce a timing pulse $V_t$, which is used by a Timing Block 340 to produce the series and shunt control signals. The timing block may be a simple exclusive-or function that turns the shunt switch off when the series switch is on, or various more elaborate schemes may be used to control relative timing of the series and shunt switches. The resulting output signals generally require amplification before they can be used to control the state of the relatively-large switching transistors. As depicted schematically in FIG. 3, a typical driver amplifier of a switch block 350, such as 355 or 360, consists of a cascade of inverters, each larger than the previous, such that the first stage can readily by driven by a digital control circuit, and the final stage is sufficiently large to drive the capacitance of a switching transistor with a periphery of several millimeters. Each inverter stage has a strongly nonlinear response, such that for a wide pulse, the rising and falling edges of the pulse are sharper at the output of the inverter than they were at the input, until they are limited by the minimum rise and fall times of the inverter stages. This nonlinear response is normally beneficial, but as a consequence, very short pulses may disappear altogether within the inverter chain. Thus, the relationship between the width of the pulse sent into the driver amplifier, and the width of the pulse delivered to the gate of the switching transistor, may incorporate an abrupt step to zero output pulse width at a finite input pulse width. The switching node potential $V_{SW}$ may still fall when the series switch turns off, even if the shunt switch does not turn on, due to the current flowing through the output inductor, which cannot change rapidly. However, if the OFF pulse to the series switch driver 355 is partially or completely lost, the series switch will remain ON, giving rise to a sudden upward step in output voltage as a function of nominal duty cycle.

Such an abrupt step gives rise to undesired control behavior. For target voltages in the region of D between the shortest pulse that is successfully transmitted through the driver amplifier, $D=D_{MAX}$, and $D=1$, an oscillation may occur. This oscillation can be regarded as a limit cycle behavior between a first condition where SW1 is always on and SW2 is always off, which will produce a relatively high output voltage, and a second condition where SW1 is off and SW2 is on for a relatively long time corresponding to $D=D_{MAX}$, producing a relatively low output voltage. The relative time spent in each condition will be adjusted to produce the desired average output voltage, but alternation between the low-D and high-D operating conditions results in oscillations in the output voltage when averaged over a few switching cycles.

An example of such an undesired oscillation is depicted in FIG. 4A and FIG. 4B, which depict measured data for an integrated circuit implementation. In this example, the converter is operating at a nominal switching frequency of about 32 MHz. When the output voltage is set to about 3.3 V for an input voltage of 3.7 V (conversion ratio of 89%), an oscillation can be seen in the output voltage 410 (FIG. 4A), with amplitude roughly 100 mV peak-to-peak at about 8 MHz ($f_{sw}$/4). Examination of the switching node voltage $V_{SW}$ (420 in FIG. 4B) reveals that the converter is alternating between two operating modes: one in which switching proceeds normally, with SW1 turning off and the node voltage falling towards ground during each 30-ns switching cycle, and a second mode in which SW1 is ON throughout the normal 30-ns switching cycle. The net result is a disturbance at an effective frequency of around 8 MHz. Since this is only slightly above the frequency at which an envelope tracking converter must intentionally vary its output, the output filter provides only moderate rejection, and the resulting spurious frequency may appear in the output of a power amplifier connected to the converter.

Such limit cycle oscillations are known in digitally-controlled converters, where they typically result from a discrepancy in the resolution of the analog-digital conversion of the sensed voltage and that of the pulse-width-modulation controller. When objectionable in the application, oscillations are avoided by appropriate control of the converter resolutions and controller bandwidth. Limit cycle oscillations may be intentionally induced and employed for compensator optimization. Oscillations have also been reported in analog-controlled buck/boost converters. Oscillation suppression methods described to date use the overlap of control regimes for buck mode and boost mode, requiring a four-switch configuration and resulting in degraded efficiency in boost mode.

For a conventional slow converter, in which the control bandwidth (the bandwidth of the compensator and output filter) is much less than the switching frequency, the output filter may be relied upon to suppress any resulting variations in the output voltage. However, when a DC-DC converter is used as an envelope tracking power supply for a radio-frequency power amplifier (RF PA), it is necessary that the output voltage of the converter vary fast enough to provide the required voltage for each symbol to be transmitted through the RF PA, or in the case of wide-bandwidth modulations like orthogonal frequency-division multiplexing (OFDM), fast enough to follow the pseudo-random variation in output transmitted power. In modern communications standards, such as WCDMA or LTE, transmit bandwidths of 3.8, 5, 10, or even 20 MHz can be used. To keep the switching frequency as low as possible for best efficiency, the output filter is configured to allow passage of voltage variations at frequencies as high as $f_{SW}/6$ or even $f_{SW}/4$. Under these conditions, oscillations in the operation of the converter will appear as variations in the voltage supplied to the RF PA. Such variations may be converted into variations in the amplitude of the transmitted signal, leading to undesired (spurious) transmitter output at frequencies offset from the carrier by the frequency of oscillation of the converter. The oscillations are of particular import when the bandwidth of the envelope tracking signal is smaller than the oscillation frequency, so that the output voltage of the converter is roughly constant for a sufficient time for oscillations to occur.

Therefore, in a DC-DC converter used as an envelope tracking power supply, it is desirable to have means to suppress oscillations at very high duty cycle, while preserving the ability to modulate the output voltage in conformance with a rapidly-varying requested supply voltage to permit efficient operation of an RF power amplifier.

SUMMARY

An embodiment includes a switching voltage regulator. The switching voltage regulator includes a series switch element, a shunt switch element, a pulse width modulation (PWM) controller, and a mode controller. For an embodiment, the PWM controller includes an error amplifier and a switching controller. For an embodiment, the error amplifier generates an error signal based on a difference between a reference voltage ($V_{REF}$) and an output voltage ($V_{OUT}$). Further, the switching controller is operative to generate switch element control voltages (series control and shunt control) based on the error signal, for controlling opening and closing of the series switch element and the shunt switch element, wherein the opening and closing of the series switch element and the shunt switch element generates a switching voltage ($V_{SW}$) having a switching frequency ($F_{SW}$), and wherein filtering the switching voltage with an output inductor ($L_{OUT}$) and a load capacitor ($C_{OUT}$) generates the output voltage ($V_{OUT}$). For an embodiment, the mode controller is operative adjust a gain of the error amplifier over a selected range of frequencies based on a parameter indicative of a likelihood of oscillations in the output voltage ($V_{OUT}$).

An embodiment includes a method of controlling a switching voltage regulator. The method includes generating, by an error amplifier, an error signal based on a difference between a reference voltage of the switching voltage regulator and an output voltage of the switching voltage regulator, and generating switch element control voltages based on the error signal for controlling opening and closing of a series switch element and a shunt switch element, wherein the opening and closing of the series switch element and the shunt switch element generates a switching voltage having a switching frequency ($F_{SW}$), and wherein filtering the switching voltage with an output inductor and a load capacitor generates the output voltage, and adjusting a gain of the error amplifier over a selected range of frequencies based on a parameter indicative of a likelihood of oscillations in the output voltage.

Other aspects and advantages of the described embodiments will become apparent from the following detailed description, taken in conjunction with the accompanying drawings, illustrating by way of example the principles of the described embodiments.

DETAILED DESCRIPTION

The described embodiments provide systems, methods and apparatuses for suppressing oscillations at an output voltage of a DC-DC converter. For at least some embodiments, the DC-DC converter is used as an envelope tracking power supply, wherein the output voltage is in conformance with a rapidly-varying requested supply voltage to permit efficient operation of an RF power amplifier.

Figure 5:
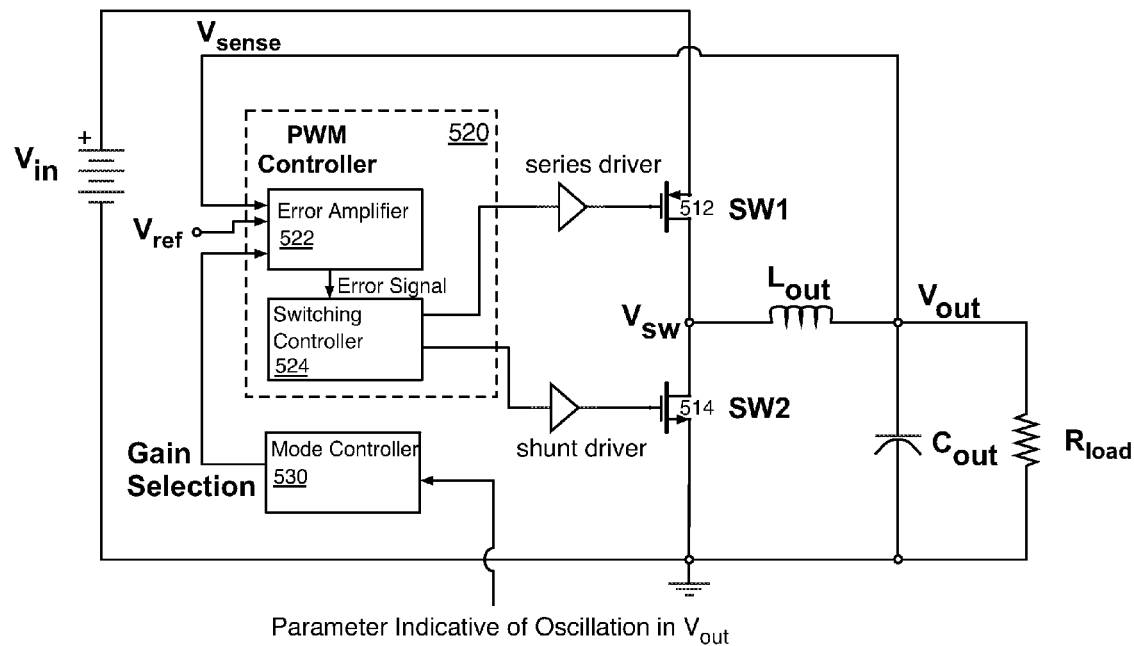
FIG. 5 shows a switching voltage regulator, according to an embodiment.

FIG. 5 shows a switching voltage regulator, according to an embodiment. The switching voltage regulator includes a series switch element (SW1) 512, a shunt switch element (SW2) 514, a pulse width modulation (PWM) controller 520, and a mode controller 530.

For an embodiment, the PWM controller 520 includes an error amplifier 522 and a switching controller 524. For an embodiment, the error amplifier 522 generates an error signal based on a difference between a reference voltage ($V_{REF}$) and an output voltage ($V_{OUT}$). Further, the switching controller 524 is operative to generate switch element control voltages (series control and shunt control) based on the error signal, for controlling opening and closing of the series switch element 512 and the shunt switch element 514, wherein the opening and closing of the series switch element 512 and the shunt switch element 514 generates a switching voltage ($V_{SW}$) having a switching frequency ($F_{SW}$), and wherein filtering the switching voltage with an output inductor ($L_{OUT}$) and a load capacitor ($C_{OUT}$) generates the output voltage ($V_{OUT}$).

For an embodiment, the mode controller 530 is operative adjust a gain of the error amplifier 522 over a selected range of frequencies based on a parameter indicative of a likelihood of oscillations in the output voltage ($V_{OUT}$).

For the described embodiments, it is to be understood that oscillations in the output voltage ($V_{OUT}$) denotes oscillations in output voltage that do not correspond to any requested variation in the output. That is, the requested voltage may include an oscillating behavior which is generally at a frequency that is substantially different than the undesirable oscillations that can occur in the output voltage ($V_{OUT}$) when, for example, the output voltage is within a threshold of the reference voltage ($V_{REF}$).

Parameter Indicative of a Likelihood of Oscillations in the Output Voltage

For an embodiment, the parameter is based on relationship between at least one of an on-time of the first switch element or an on-time of the second switch element, and a period of the switching frequency.

For an embodiment, the parameter is based on a duty cycle, wherein the duty cycle is based on the on-time of the first switch element relative to a period of the switching frequency. For an embodiment, the gain of the error amplifier is decreased over the selected range of frequencies when the duty cycle is sensed to be greater than a first threshold. For an embodiment, the duty cycle is measured at the output of the PWM controller. In an alternative embodiment, the duty cycle is measured at the switching node.

For an embodiment, when the duty cycle is higher than a first threshold value, the PWM controller error amplifier gain is reduced in the frequency range relevant to suppression of the sub-harmonic oscillations. The gain is returned to the default condition when the duty cycle falls below a second threshold value. The change in gain configuration may be performed in conjunction with a procedure of holding SW2 off, as described below, or may be used independently of changes in SW2 control. Gain changes may be made through changing the configuration of the error amplifier feedback network, the error amplifier input network, or both. Gain changes may be limited to a relatively narrow region of frequency, or may extend over substantially the whole useful frequency range of the error amplifier.

For an embodiment, the controlled closing and opening of the shunt switch element includes a series of pulses, and wherein the parameter is based on detecting missed pulses of the controlled closing and opening of the shunt switch element. For an embodiment, a gate voltage at the shunt switch SW2 is monitored, and a missed pulse, defined as the lack of a rising edge in the control voltage during one complete switching cycle, is detected and used to implement the changes in compensator behavior and shunt switch control described above.

For an embodiment, the parameter is based on sensing of the output voltage exceeding a predetermined output voltage threshold.

For an embodiment, the parameter is based on sensing of the reference voltage exceeding a predetermined reference voltage threshold. It is to be understood that the reference or requested voltage can be in the form of an analog value or a digital value.

For an embodiment, the parameter is based on sensing an output of the error amplifier exceeding a predetermined error amplifier signal threshold.

An embodiment further includes turning the second switch (that is, the shunt switch SW2) off based on the parameter indicative of the likelihood of oscillations in the output voltage. For an embodiment, the control of the shunt switch SW2 is turned off when the duty cycle is higher than a first threshold value, and turned back on again when the duty cycle is lower than a second threshold value. When SW2 is held off, but the output inductor current is large, the voltage at the output node $V_{SW}$ falls when SW1 is turned off, until the freewheeling diode consisting of the drain junction of SW2 turns on. Thus the converter output voltage still depends on the duty cycle, but the discontinuity in SW2 pulse width is suppressed, and thus oscillations do not occur. For an embodiment the first and second duty cycle threshold values are equal.

For an embodiment, the parameter is based on a duty cycle, wherein the duty cycle is based the on-time of the first switch element relative to the period of the switching frequency. Further, the mode controller is operative to decrease the gain of the error amplifier over the selected range of frequencies when the duty cycle is sensed to be greater than a first threshold, and increase the gain back to an original setting when the duty cycle is sensed to be less than a second threshold. For an embodiment, the duty cycle is sensed by sensing the switching voltage at a switching node. For an embodiment, the duty cycle is sensed at an output of the switching controller.

For an embodiment, the change in gain is implemented when the converter output voltage, relative to the input voltage, exceeds a first threshold, and is returned to the default configuration when the output voltage, relative to the input voltage, returns below a second threshold. In an embodiment, the output voltage is the measured output voltage; in an alternative embodiment, the output voltage is the commanded output voltage, obtained as an analog or digital value input to the converter.

For an embodiment, the change in gain is implemented when the error amplifier output level exceeds a first threshold, and is returned to the default configuration when the error amplifier output level returns below a second threshold.

Figure 6:
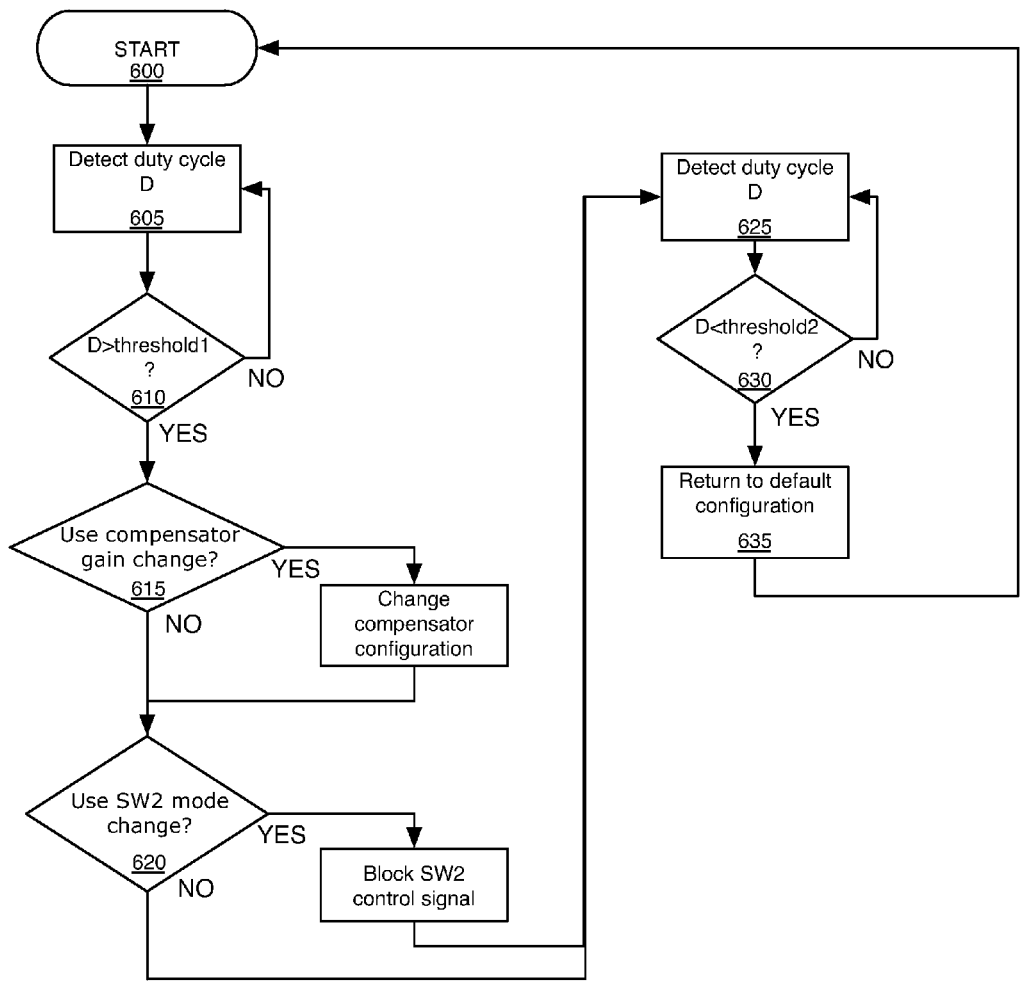
FIG. 6 is a flow chart that includes steps of a method of controlling a switching voltage regulator, according to an embodiment.

FIG. 6 is a flow chart that includes steps of a method of controlling a switching voltage regulator, according to an embodiment. This method includes detecting and monitoring the value of the duty cycle. After startup 600, the duty cycle of the converter is detected (605) and compared with a first threshold value (610). If the current duty cycle exceeds the first threshold, one or both of two possible changes is made. The first configuration change 615 holds the shunt switch SW2 in the off (open) condition. The second configuration change 620 modifies the gain-vs-frequency behavior of the error amplifier compensator. Monitoring of the duty cycle then continues (625); when the duty cycle is found to be below a second threshold (630), the configuration of the converter is returned to the default state (635), and monitoring continues.

Figure 7A:
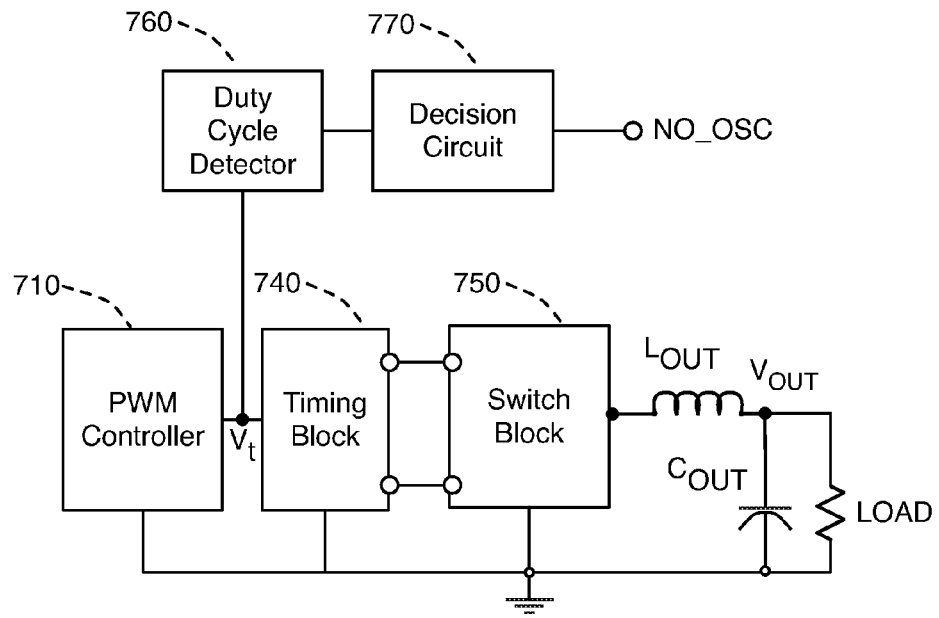
FIG. 7A shows duty cycle detection using the output signal of the PWM controller, according to an embodiment.
Figure 7B:
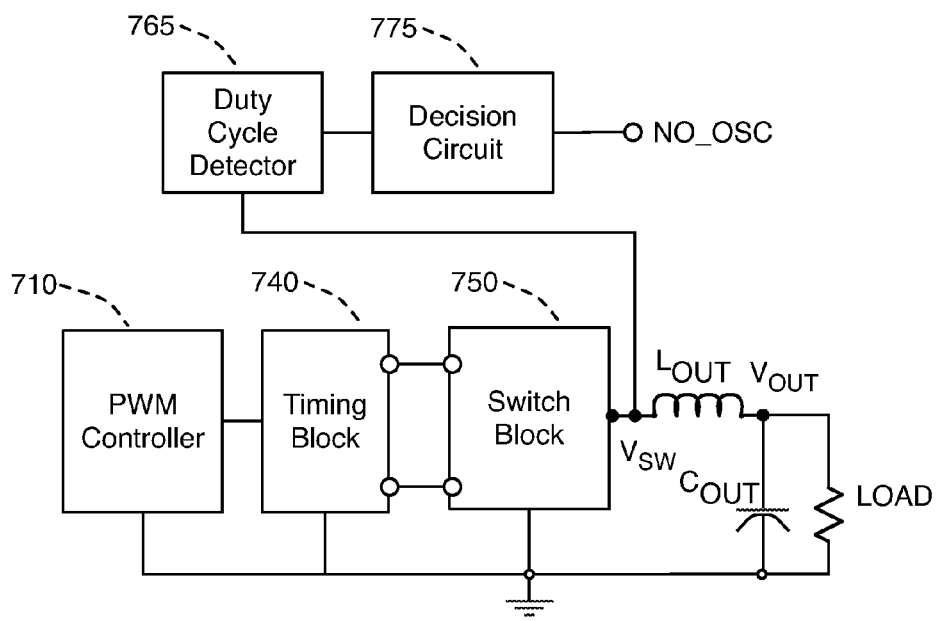
FIG. 7B shows duty cycle detection using the switch block output, according to an embodiment.

Two exemplary embodiments for duty cycle detection are depicted schematically in FIGS. 7A and 7B. In an embodiment (FIG. 7A), the signal $V_t$ at the output of the PWM Controller 710 is analyzed to determine the current value of the duty cycle D. In an alternative embodiment (FIG. 7B) the signal $V_{SW}$ at the output of the switch block 750 is analyzed to determine the current value of the duty cycle D. FIG. 7A includes the PWM controller 710, a timing block 740, a switch block 750, a duty cycle detector 760 and a decision circuit 770. FIG. 7B also includes the PWM controller 710, the timing block 740, and the switch block 750. However, a duty cycle detector 765 alternatively receives its input from the output of the switch block 750, and provides an output to a decision circuit 775.

Figure 8A:
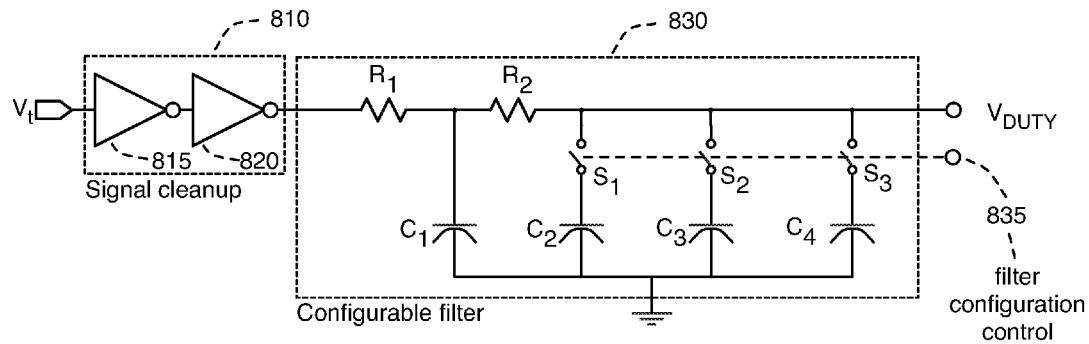
FIG. 8A shows example implementation of a duty cycle detector for analyzing the signal Vt, according to an embodiment.
Figure 8B:
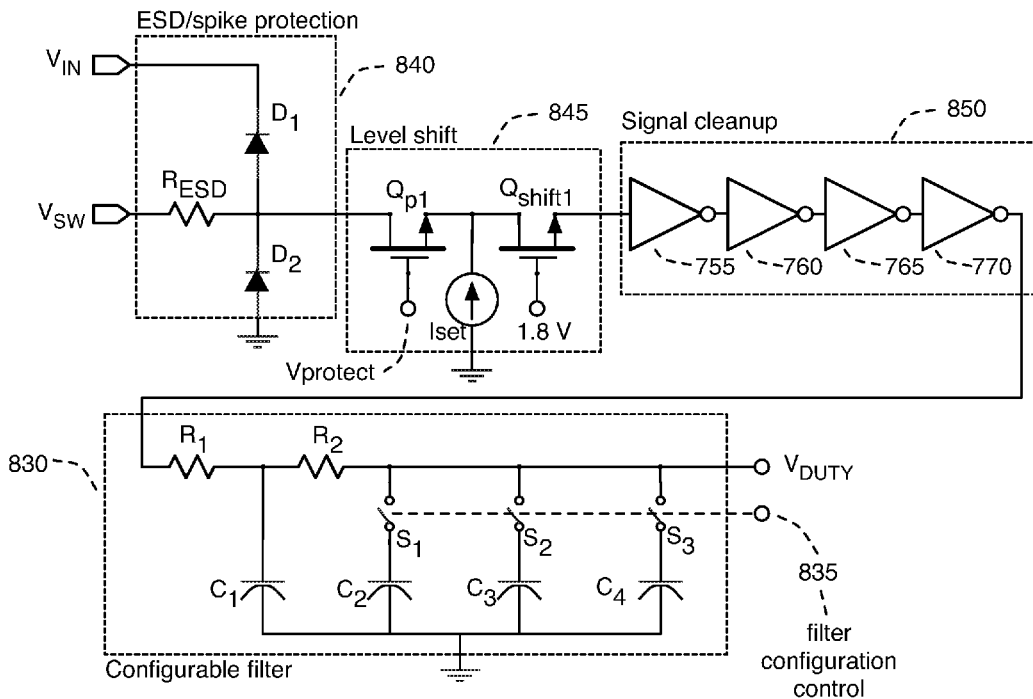
FIG. 8B shows example implementation of a duty cycle detector for analyzing the signal VSW, according to an embodiment.

An exemplary implementation of a duty cycle detection circuit corresponding to each of the two embodiments depicted in FIG. 7A and FIG. 7B is shown in FIG. 8A. FIG. 8A shows an example circuit for analyzing the signal $V_t$ to estimate the duty cycle, corresponding to FIG. 7A. FIG. 8B shows an example circuit for analyzing the signal $V_{SW}$ to estimate the duty cycle, corresponding to FIG. 7B. In both cases the signal of interest is passed through a low-pass filter to extract an average voltage which may be associated with the duty cycle of the buck converter.

In the circuit of FIG. 8A, the signal from the PWM Controller 710 is first passed through a Signal Cleanup block 810, consisting here of a pair of inverters 815 and 820. These inverters are typically of small size and display rapid rise and fall times, so that the net effect is to ensure that the input signal is characterized as either low or high at any time, with very rapid transitions between the two extreme values. These inverters also serve to minimize loading of the $V_t$ node by the subsequent filter circuit.

The signal is received by a configurable filter 830, consisting of a two-stage R-C filter combined with a plurality of optional capacitors $C_2$-$C_4$, and controllable by control line 835. The filter extracts variations of the duty cycle on the time scale of intentional output voltage variations, while rejecting the switching frequency. For example, in the case where the buck converter is employed as an envelope tracking power supply for a WCDMA communications amplifier, the transmitted signal has an RF bandwidth of about 3.8 MHz. The envelope of the signal has a much wider bandwidth, but the components at high frequency have modest effects on efficiency, and the actual envelope modulation is generally processed or filtered to a bandwidth comparable to that of the transmitted signal. Therefore, the output voltage of the converter will be changed intentionally with a bandwidth of several MHz. The optimal duty cycle filter bandwidth depends on the approach used in processing the envelope signal, and must be determined for a specific application. In an exemplary implementation of the duty cycle filter, the values of the components are chosen to provide a 3-dB filter bandwidth of from about 1 to 4 MHz, for a switching frequency of 35 MHz.

In a typical integrated circuit implementation of a buck converter, the voltage $V_t$ is an internal control voltage, not directly connected to an externally-accessible pad. $V_{SW}$ is an output value, for those designs where an off-chip inductor is used, and thus is connected to an externally-accessible pad. Therefore, protection must be provided to internal circuitry for the case where the $V_{SW}$ pad undergoes a sudden excursion in voltage, due to an electrostatic discharge event, inductor saturation, spikes from the switch transitions themselves, and other possible causes. $V_{SW}$ is also referenced to the input voltage and ground as nominal high and low values, whereas Vt is an internal control signal generally referenced to a lower peak voltage, produced for example by an internal voltage regulator. Therefore, the circuit of FIG. 8B includes an ESD/spike protection block 840 and a level shift block 845, in addition to the signal cleanup block 850 and configurable filter block 830. The ESD/spike protection block 740 is depicted as using single diodes $D_1$ and $D_2$, but multiple diodes in series, or other of the many means of clamping voltages for ESD protection may be used instead. The signal cleanup block 850 also contains additional buffers 865 and 870, to correct the relatively slow edges output by the level shifter 845.

Figure 9:
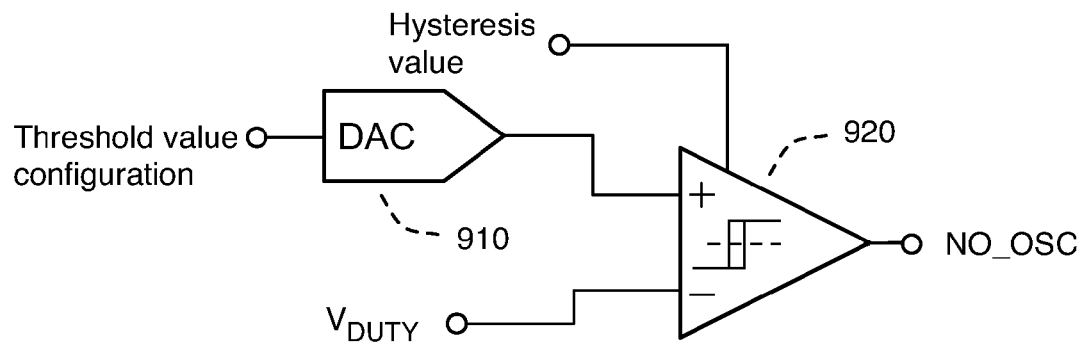
FIG. 9 shows comparison of the duty cycle to a configurable threshold, with configurable hysteresis; the output is used to make one or both of two configuration changes, according to an embodiment.
Figure 9:
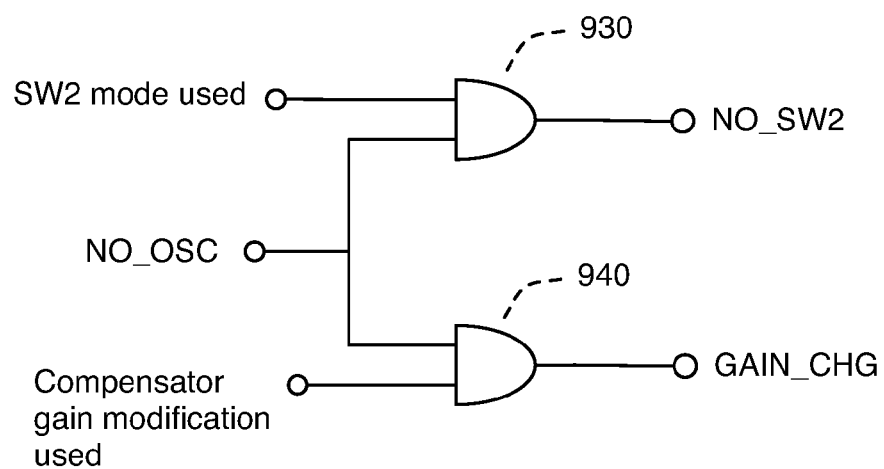

The output of the duty cycle detector is directed to a decision circuit. An exemplary embodiment is depicted in FIG. 9. The duty cycle detector output $V_{DUTY}$ is compared to a threshold voltage, whose value is configurable to account for the requirements of a specific application. The threshold voltage may be provided by a digital-analog converter 910 as shown in the figure, or by an equivalent means. The comparison is performed by a hysteretic comparator 920, to avoid chattering between operating configurations when the duty cycle is close to the threshold. The hysteresis value is similarly configurable.

The output of the inverter is then directed to AND gates 930 and 940 that implement either or both of the configuration changes used to suppress oscillations at high duty cycle. While a simple logic circuit is shown in this example, any decision process based in custom logic, configurable logic, software control of a processor, or equivalent, may be used to change the configuration of the converter based on the measured duty cycle.

Once it has been established that the duty cycle has exceeded the desired threshold, a change in compensator gain may be implemented in response to a HIGH value of the signal GAIN_CHG. A nonlinear step in the response may be approximately treated with a describing function, whose effect is to increase the equivalent linear gain without changing the phase relationship of the input and output. An oscillation may occur at the frequency where the linear control system, including the effects of the PWM controller sampling behavior, has a loop phase shift of 180 degrees (360 degrees including the inverting amplifier in the controller). The linear system by itself may be stable at this frequency, because the gain of the linear system is substantially less than 1—that is, the system has substantial gain margin. However, when the nonlinear behavior contributes an effective describing function gain much larger than 1, the gain margin of the whole system may be degraded to the point where oscillations occur. To prevent the oscillations, additional gain margin must be included in the frequency range where oscillations are expected.

In an embodiment, gain change may be implemented by modifying the state of the feedback network without affecting that of the input network. An exemplary configuration is depicted in FIG. 10.

Figure 10:
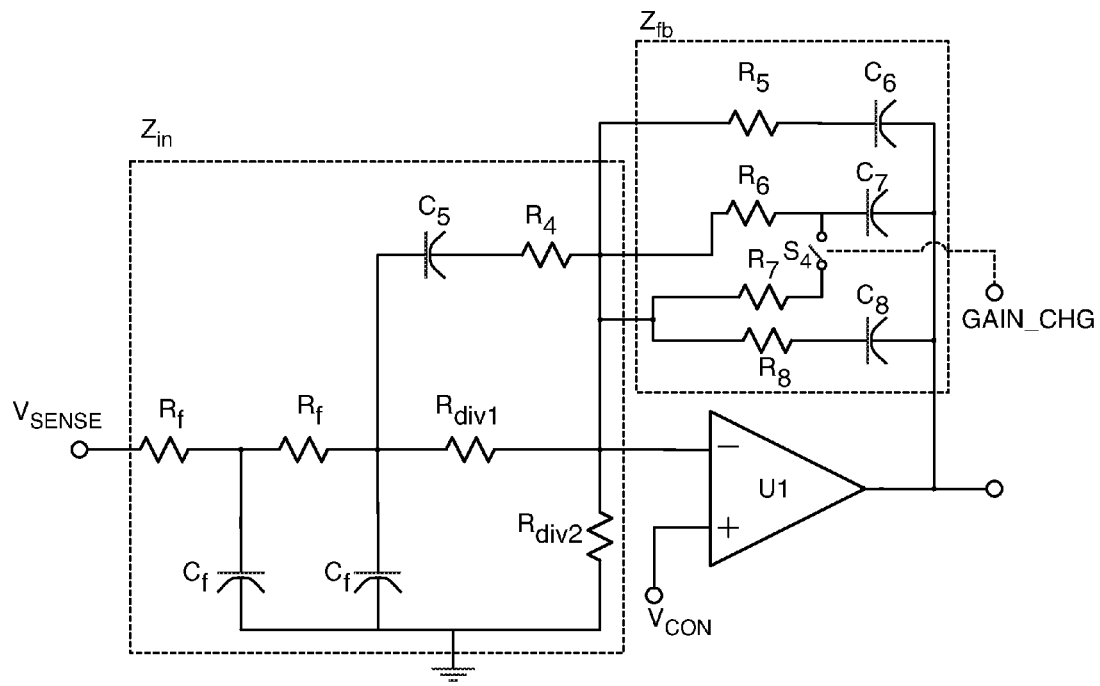
FIG. 10 show an alternative configuration for implementing error amplifier gain change, according to an embodiment.

The compensator shown in FIG. 10 is sometimes referred to as "a Type III compensator". U1 is a high-gain operational amplifier. Resistor $R_4$ and capacitor $C_5$ form a feedforward branch. Resistors $R_5$ through $R_8$ and capacitors $C_6$ through $C_8$ form the feedback network. When GAIN_CHG is low, switch $S_4$ is open, and $R_7$ is disconnected. When GAIN_CHG goes high, $S_4$ closes. In the exemplary implementation, $R_6$ is much larger than $R_7$, $R_7$ and $R_8$ are equal, and $C_7$ and $C_8$ are equal. Therefore, when $S_4$ is closed, $R_6$ can be ignored, and $R_7/C_7/R_8/C_8$ together have the same frequency response as $R_8/C_8$, but with half the absolute impedance. Since the gain of the amplifier is approximately $Z_{fb}/Z_{in}$, closing $S_4$ results in roughly a two-fold (6 dB) reduction in the voltage gain of the error amplifier in the frequency range where $R_8/C_8$ dominates the feedback impedance. If the pole of the $R_8/C_8$ subnetwork is chosen to be in the range where limit cycle oscillations are likely in the presence of pulse response nonlinearity, additional gain margin is provided when $S_4$ is closed.

Figure 11:
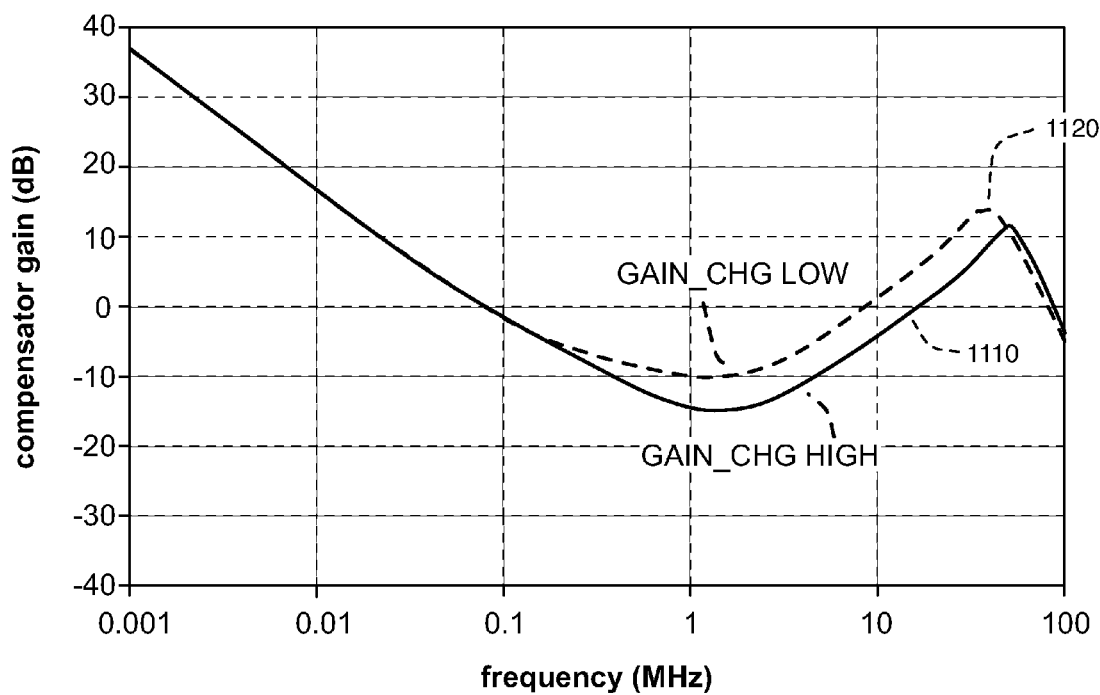
FIG. 11 shows gain vs. frequency for the error amplifier configuration of FIG. 10.

The resulting change in gain vs. frequency for an example embodiment of the alternative gain change is depicted in FIG. 11. The gain of the compensator when GAIN_CHG is high, trace 1110, is reduced by about 6 dB relative to when GAIN_CHG is low, trace 1120, in the region between around 500 kHz and 30 MHz, where oscillations due to nonlinearity are a concern. Differing changes in gain can be obtained by using different component values for $R_7$ and $C_7$ while keeping their product unchanged. Alternative means for varying component values, such as the use of varactor capacitors and/or FET resistors, can be substituted for the switched network shown.

Figure 12:
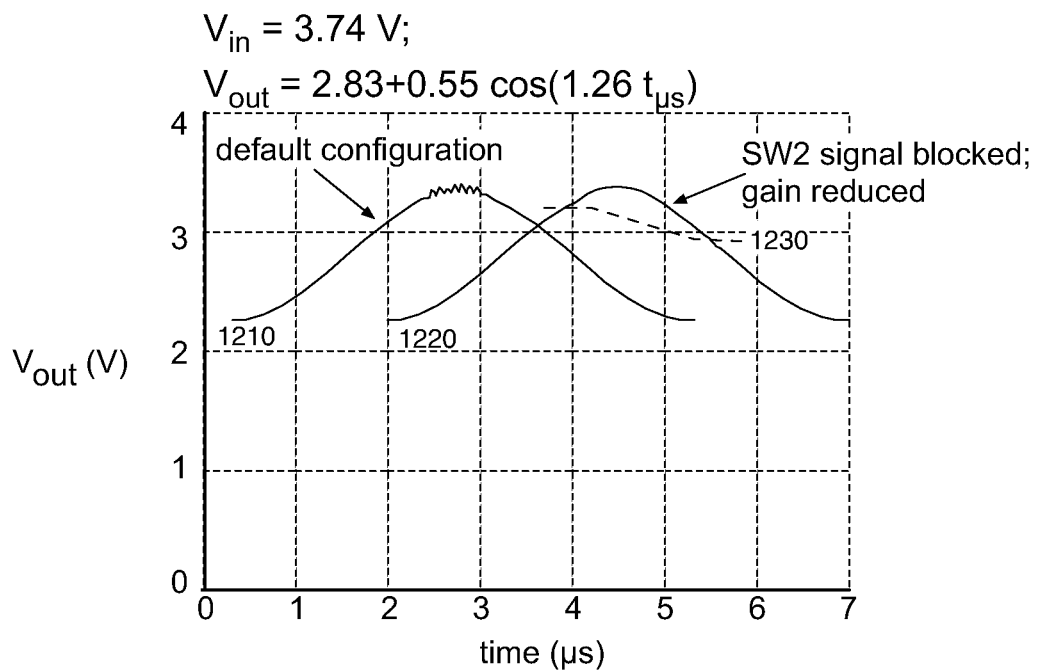
FIG. 12 shows an example of oscillation suppression, using the configuration of FIG. 10.

An example of oscillation suppression, using the embodiment described above, is shown in FIG. 12. Two oscilloscope traces 1210 and 1220 are shown on the same diagram, offset in time for clarity. In both cases the input voltage is 3.74 V, and the nominal output voltage is a 200 kHz sine wave offset by 2.83 V: $V_{out}$=2.83+0.55 cos (1.26 t), where the time is measured in microseconds. The peak output voltage is thus about 3.38 V, corresponding to a conversion ratio (Vout/Vin)=90.4%. The average output current is 105 mA in both cases. Trace 1210 shows the result obtained using the default configuration, where the SW2 pulse is always transmitted into the shunt switch driver and the compensation gain is held constant. It is apparent that a region of instability occurs around 3.3 to 3.4 volts out. In the case of trace 1220, in the region where the trace is above the dotted line 1230 (that is, for times between 4 and 5.5 microseconds), the oscillation suppression measures described above are employed: that is, the SW2 signal is blocked from entering the switch block driver amplifier, and the compensator gain is reduced by closing $S_4$ as depicted in FIG. 10. It is apparent that the output voltage varies smoothly, without instability, in the peak output voltage region, at the cost of slight disturbances in output voltage when the configuration is changed.

It can be determined that the presence of limit cycle oscillations is sensitive to small changes in ground inductance and coupling of synchronous noise to the loop input. Limit cycle oscillations may be absent in some conditions with no need for the provisions described above, or larger changes in gain than those described may be needed to suppress oscillation. Empirical optimization of a specific implementation is necessary for reliable performance in a given application.

Figure 1:
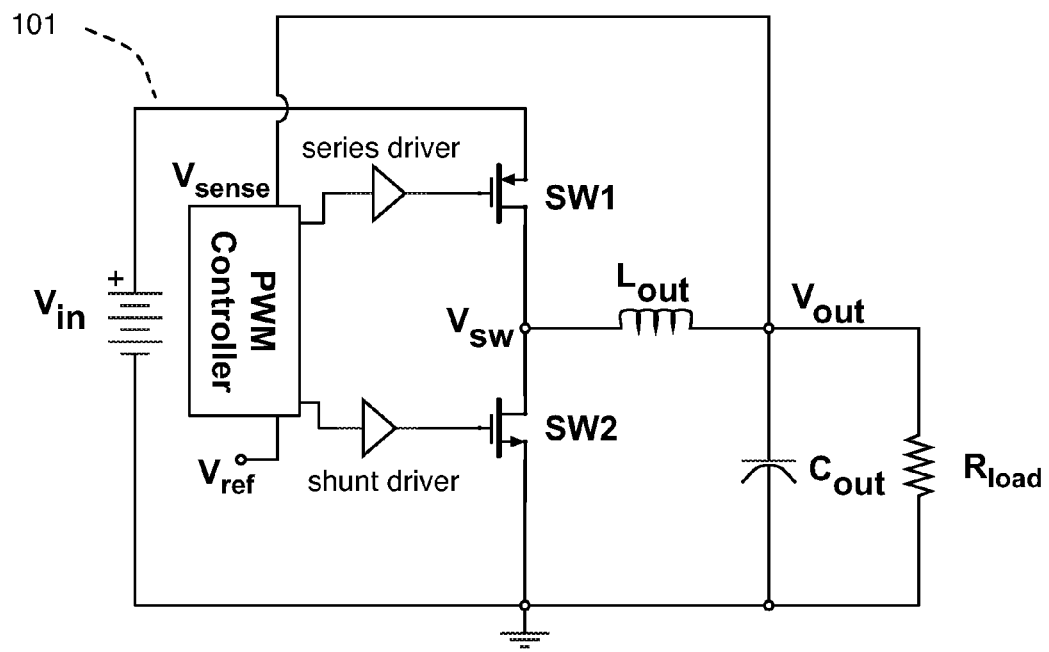
FIG. 1 depicts a typical buck converter with PWM controller, according to the prior art.
Figure 2:
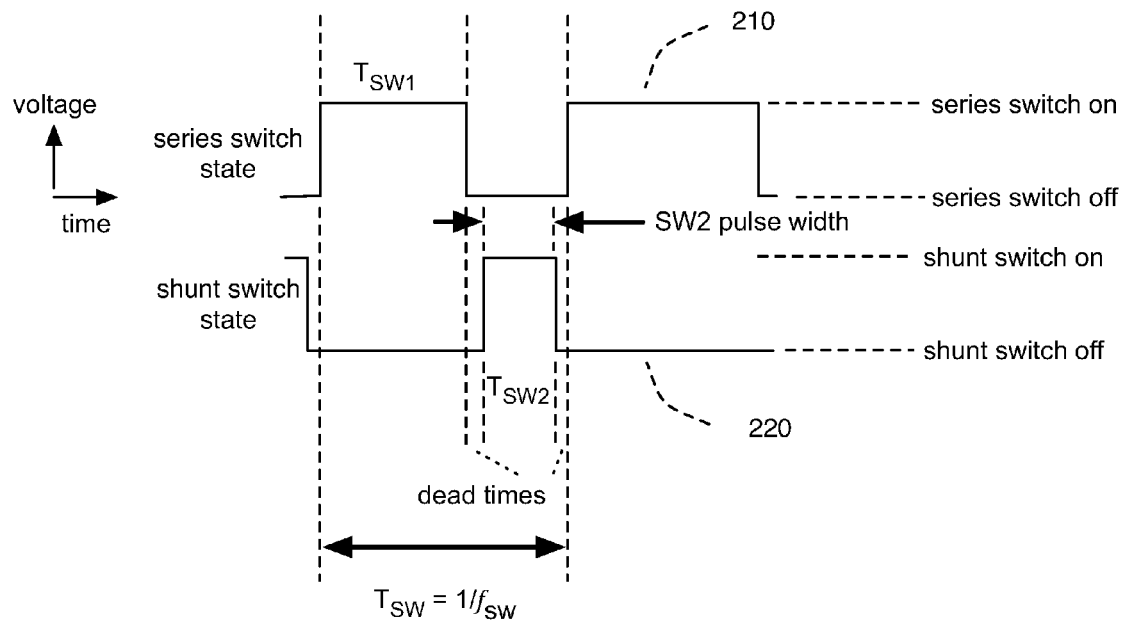
FIG. 2 depicts exemplary buck converter switch timing, according to the prior art.
Figure 3:
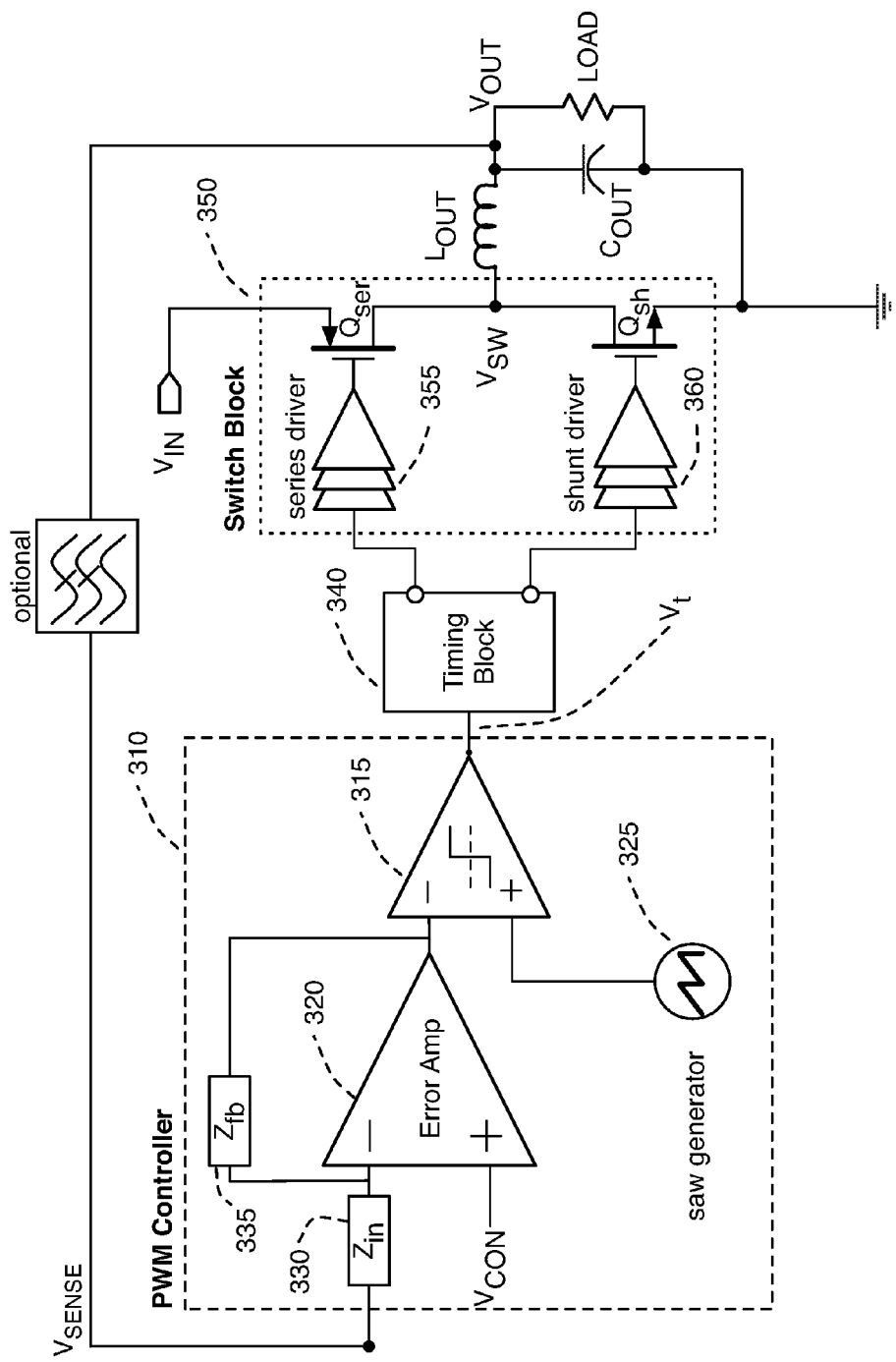
FIG. 3 is a more detailed view of an exemplary buck converter, showing error amplifier, saw comparator, timing block, and driver amplifiers, according to the prior art.
Figure 4A:
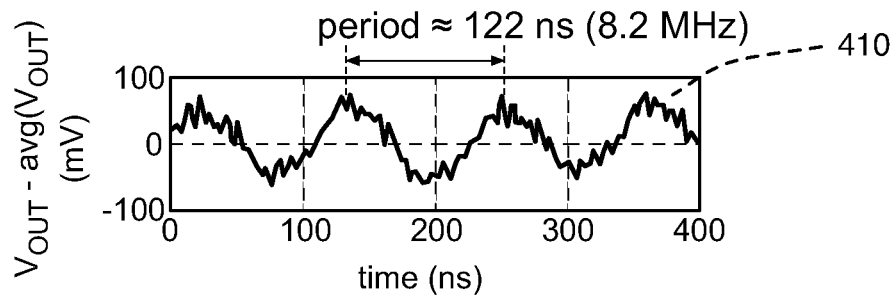
FIG. 4A shows AC-coupled output voltage vs. time for an example of undesired limit-cycle oscillation in a high-frequency converter, according to the prior art.
Figure 4B:
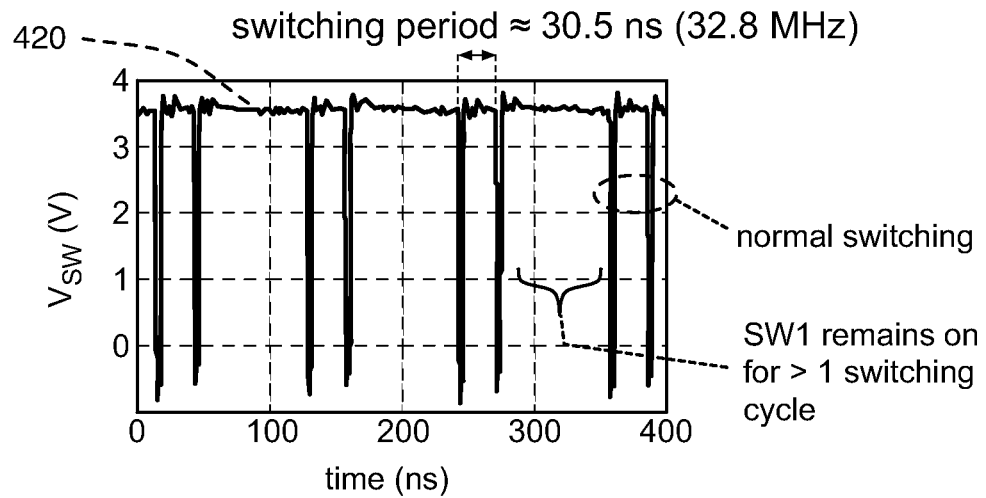
FIG. 4B shows switching node voltage vs. time for an example of undesired limit-cycle oscillation in a high-frequency converter, according to the prior art.
Figure 13:
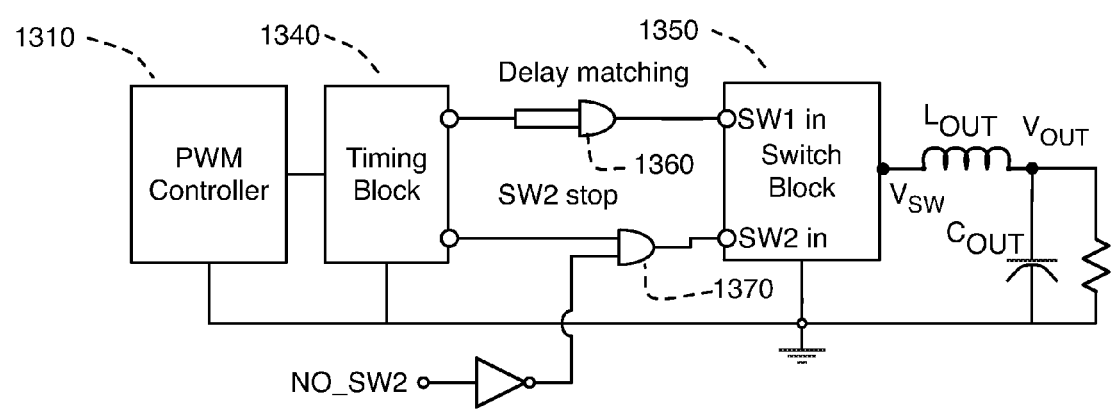
FIG. 13 shows an alternative embodiment, in which the control signal to SW2 is blocked to suppress limit-cycle oscillations, according to an embodiment.

FIG. 13 shows an alternative embodiment, in which the control signal to SW2 is blocked to suppress limit-cycle oscillations, according to an embodiment. The circuit of FIG. 13 provides a means for suppressing the signal to the shunt switch driver, such as 360, as an alternative means of suppressing oscillation. By terminating the connection to the driver amplifier, the discontinuity in response with input pulse duration discussed previously is prevented, at a modest cost in efficiency. (Since the shunt switch no longer turns on, the switch node will always be drawn below ground until the body diode of the shunt switch turns on, and thus the output current will encounter an additional voltage drop through the diode. However, since the operating condition at which these measures are employed is always at a high duty cycle, the series switch is on most of the time, and the additional dissipation due to activation of the shunt switch body diode is minimal.) As described in connection with FIG. 3, a Timing Block, such as 340 or 1340 (which receives an output from the PWM controller 1310), is generally employed to generate the control signals for SW1 and SW2 from the output of the saw comparator in the PWM Controller block. To make the SW2 signal configurable, an AND gate 1370 is placed between the SW2 output of the Timing Block and the SW2 input of the Switch Block 1350. When NO_SW2 goes high, the input to AND gate 1370 is held low, so that the output is held low, and SW2 remains off (open). When NO_SW2 is low, the output of 1370 follows the SW2 signal from the timing block. A second AND gate 1360 is inserted to avoid introducing any relative delay between the signal paths for SW1 and SW2. Additional circuitry may support alternative modes in which either of the two switches is forced on or off, as long as equality of delay between the SW1 and SW2 paths is maintained.

Figure 14:
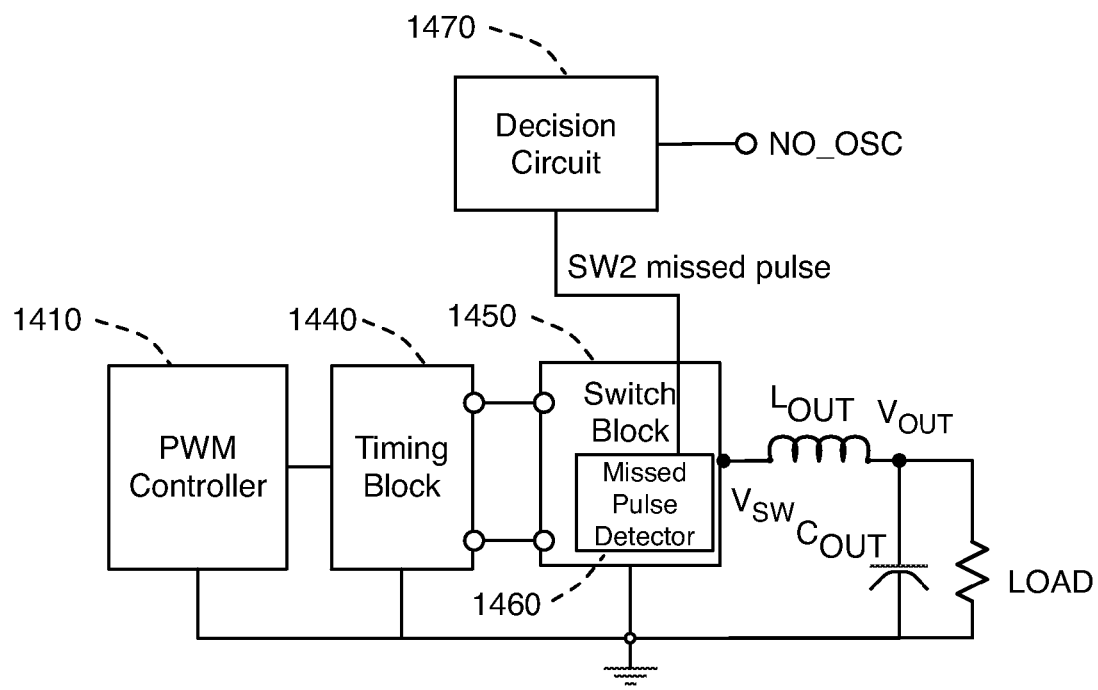
FIG. 14 shows an alternative embodiment in which missed pulse detection is used to control oscillation suppression.

In the case where oscillation is associated with the abrupt disappearance of control pulses at the shunt switch input, detection of missed pulses by a missed pulse detector 1460 may be used to initiate oscillation suppression, as depicted schematically in FIG. 14. As previously shown and described, the output of the PWM controller 1410 is received by the timing block 1440. The output of the timing block 1440 is received by the switch block 1450, and the switch block 1450 includes the missed pulse detector. The decision circuit 1470 receives an output of the missed pulse detector 1460.

An edge detector on the gate of SW2 can be used as a missed pulse detector, where a missed pulse is reported when no rising edge of the SW2 gate signal is detected between two rising edges of the switching clock, which together define a complete switching cycle. The gain of the compensator may be reduced as described above to improve margin against oscillations, and held so until the frequency of missed pulses is reduced sufficiently. The missed pulse detection method is not compatible with the use of shunt switch signal suppression.

Figure 15A:
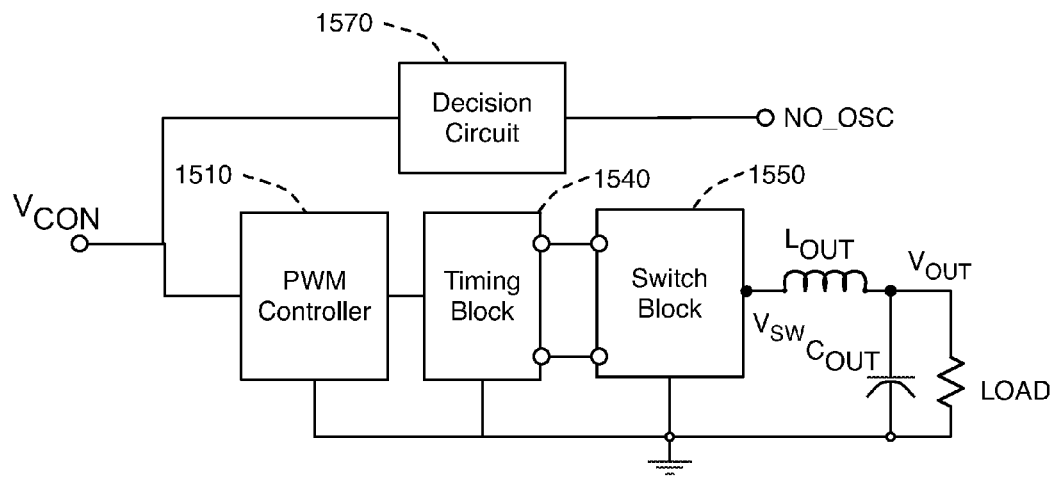
FIG. 15A shows an embodiment in which detection of the threshold for oscillation suppression is performed using the commanded output voltage signal.
Figure 15B:
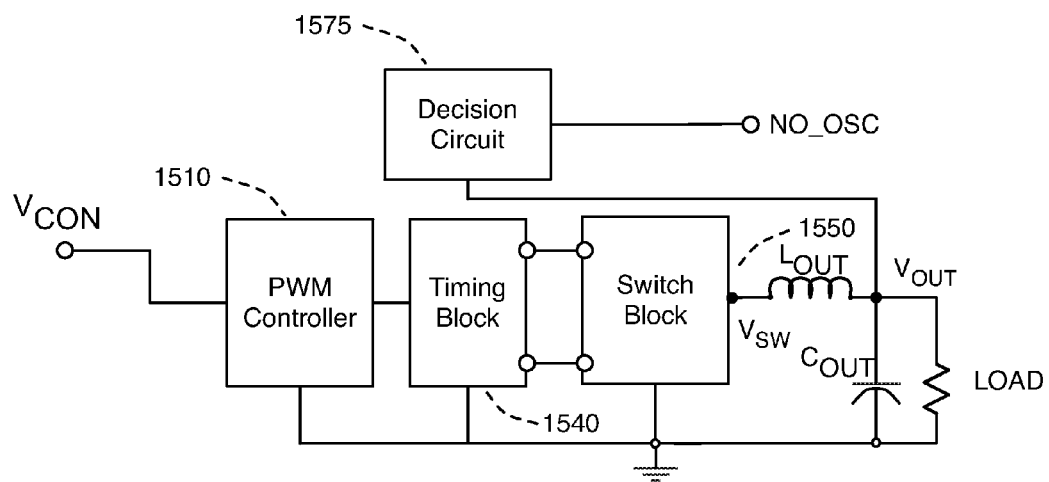
FIG. 15B shows an embodiment in which detection of the threshold for oscillation suppression is performed using the actual converter output voltage.

In an embodiment, oscillation suppression may be initiated when the output voltage of the converter exceeds a first threshold. The decision may be based on the commanded output voltage $V_{CON}$, as depicted in FIG. 15A or the actual output voltage (equivalent to the voltage $V_{SENSE}$ shown in FIG. 11), as depicted in FIG. 15B. The decision circuit may use any conventional means of detecting specific voltage thresholds, such as a comparator, or an analog-to-digital converter. The commanded voltage may be an analog value or a digital value. For at least some embodiments, the decision is additionally based on the value of $V_{in}$, which is typically available in mobile devices.

As shown in FIG. 15A, the PWM controller 1510 and the decision circuit 1470 receive the commanded output voltage $V_{CON}$. Further, an output of the PWM controller 1510 is received by the timing block 1540, and an output of the timing block 1540 is received by the switch block 1550.

As shown in FIG. 15B, the PWM controller 1510 receives the commanded output voltage $V_{CON}$. However, the decision circuit 1470 alternatively receives the output voltage $V_{OUT}$. Further, the output of the PWM controller 1510 is received by the timing block 1540, and the output of the timing block 1540 is received by the switch block 1550.

Figure 16:
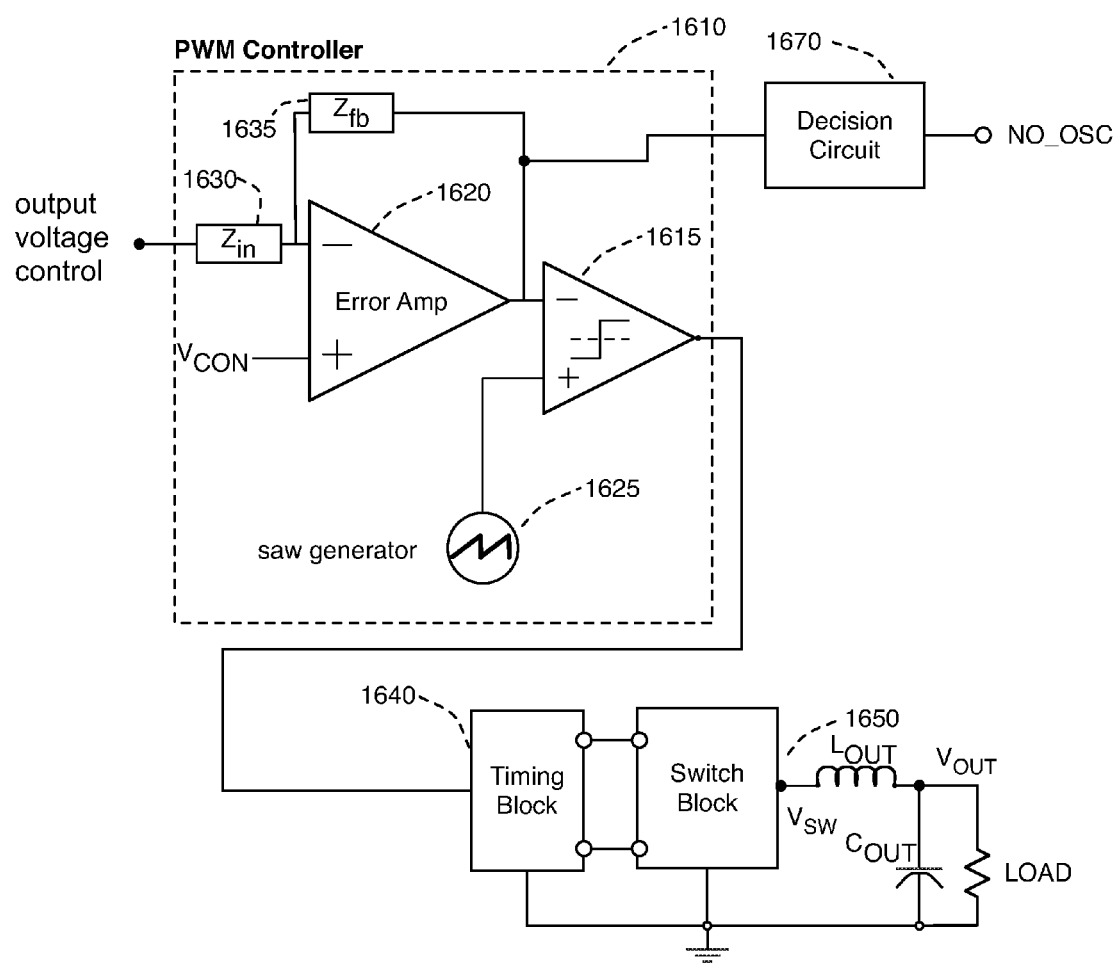
FIG. 16 shows an embodiment in which detection of the threshold for oscillation suppression is performed using the value of the error amplifier output signal.

In an embodiment, oscillation suppression may be initiated when the output voltage of the error amplifier exceeds a first threshold, as depicted in FIG. 16. The PWM Controller 1610 comprises an error amplifier 1620 with frequency-dependent compensation 1630 and 1635, to enable the converter to adjust the duty cycle for the desired output voltage while maintaining stable operation. The error amplifier 1620 output is normally directed to a comparator 1615, whose reference voltage is a sawtooth waveform 1625; thus, the error amplifier output value determines the requested duty cycle of the converter. The output of 1620 is directed to a Decision Circuit 1670. The decision circuit may use any conventional means of detecting specific voltage thresholds, such as a comparator, or an analog-to-digital converter. The error amplifier output is compared by the comparator 1615 to the sawtooth waveform 1625 to produce a timing pulse, which is used by a Timing Block 1640 to produce the series and shunt control signals for a switch block 1640.

Although specific embodiments have been described and illustrated, the embodiments are not to be limited to the specific forms or arrangements of parts so described and illustrated.

What is claimed:

1. A switching voltage regulator, comprising:
   a series switch element;
   a shunt switch element;
   a pulse width modulation (PWM) controller comprising;
   an error amplifier, the error amplifier generating an error signal based on a difference between a reference voltage and an output voltage; and
      a switching controller, the switching controller operative to generate switch element control voltages based on the error signal, for controlling opening and closing of the series switch element and the shunt switch element, wherein the opening and closing of the series switch element and the shunt switch element generates a switching voltage having a switching frequency ($F_{SW}$), and wherein filtering the switching voltage with an output inductor and a load capacitor generates the output voltage;
   the switching voltage regulator further comprising;
   a mode controller, the mode controller operative to:
      adjust a gain of the error amplifier over a selected range of frequencies based on a parameter indicative of a likelihood of oscillations in the output voltage, wherein the parameter is based on a duty cycle, wherein the duty cycle is based the on-time of the series switch element relative to the period of the switching frequency; and wherein the mode controller is operative to:
      decrease the gain of the error amplifier over the selected range of frequencies when the duty cycle is sensed to be greater than a first threshold; and
      increase the gain back to an original setting when the duty cycle is sensed to be less than a second threshold.

2. A switching voltage regulator, comprising:
   a series switch element;
   a shunt switch element;
   a pulse width modulation (PWM) controller comprising;
   an error amplifier, the error amplifier generating an error signal based on a difference between a reference voltage and an output voltage; and
      a switching controller, the switching controller operative to generate switch element control voltages based on the error signal, for controlling opening and closing of the series switch element and the shunt switch element, wherein the opening and closing of the series switch element and the shunt switch element generates a switching voltage having a switching frequency ($F_{SW}$), and wherein filtering the switching voltage with an output inductor and a load capacitor generates the output voltage;
   the switching voltage regulator further comprising;
   a mode controller, the mode controller operative to:
      adjust a gain of the error amplifier over a selected range of frequencies based on a parameter indicative of a likelihood of oscillations in the output voltage, wherein the controlled closing and opening of the shunt switch element includes a series of pulses, and wherein the parameter is based on detecting missed pulses of the controlled closing and opening of the shunt switch element.

3. The switching voltage regulator of claim 1, wherein the duty cycle is sensed by sensing the switching voltage at a switching node.

4. The switching voltage regulator of claim 1, wherein the duty cycle is sensed at an output of the switching controller.

5. A switching voltage regulator, comprising:
   a series switch element;
   a shunt switch element;
   a pulse width modulation (PWM) controller comprising;
   an error amplifier, the error amplifier generating an error signal based on a difference between a reference voltage and an output voltage; and
      a switching controller, the switching controller operative to generate switch element control voltages based on the error signal, for controlling opening and closing of the series switch element and the shunt switch element, wherein the opening and closing of the series switch element and the shunt switch element generates a switching voltage having a switching frequency ($F_{SW}$), and wherein filtering the switching voltage with an output inductor and a load capacitor generates the output voltage;
   the switching voltage regulator further comprising;
   a mode controller, the mode controller operative to:
      turn off the shunt switch based on a parameter indicative of a likelihood of oscillations in the output voltage.

6. A method of controlling a switching voltage regulator, comprising:
   generating, by an error amplifier, an error signal based on a difference between a reference voltage of the switching voltage regulator and an output voltage of the switching voltage regulator; and
   generating switch element control voltages based on the error signal for controlling opening and closing of a series switch element and a shunt switch element, wherein the opening and closing of the series switch element and the shunt switch element generates a switching voltage having a switching frequency ($F_{SW}$), and wherein filtering the switching voltage with an output inductor and a load capacitor generates the output voltage; and adjusting a gain of the error amplifier over a selected range of frequencies based on a parameter indicative of a likelihood of oscillations in the output voltage, wherein the parameter is based on a duty cycle, wherein the duty cycle is based the on-time of the series element relative to the period of the switching frequency; and wherein the mode controller is operative to:

decrease the gain of the error amplifier over the selected range of frequencies when the duty cycle is sensed to be greater than a first threshold; and increase the gain back to an original setting when the duty cycle is sensed to be less than a second threshold.

7. The switching voltage regulator of claim 6, wherein the duty cycle is sensed at an output of the switching controller.

* * * * *